(12) United States Patent
Statt

(10) Patent No.: US 6,873,433 B1
(45) Date of Patent: Mar. 29, 2005

(54) CALIBRATION OF COLOR REPRODUCTION APPARATUS

(75) Inventor: David J. Statt, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/521,588

(22) Filed: Mar. 9, 2000

(51) Int. Cl.$^7$ .............................. B41B 1/00; G03F 3/08; H04N 1/46
(52) U.S. Cl. ....................... 358/1.9; 358/518; 358/525
(58) Field of Search ........................ 358/1.9, 518, 525, 358/523, 520, 539, 504, 500; 382/167, 165; 283/114; 702/85; 347/19

(56) References Cited

U.S. PATENT DOCUMENTS

| | | | |
|---|---|---|---|
| 4,959,711 A | * 9/1990 | Hung et al. .................. 358/523 |
| 5,053,866 A | 10/1991 | Johnson |
| 5,081,529 A | * 1/1992 | Collette ....................... 358/504 |
| 5,200,832 A | * 4/1993 | Taniuchi et al. ............. 358/300 |
| 5,363,318 A | * 11/1994 | McCauley .................... 702/85 |
| 5,416,613 A | * 5/1995 | Rolleston et al. ........... 358/518 |
| 5,452,112 A | * 9/1995 | Wan et al. ................... 358/504 |
| 5,483,259 A | * 1/1996 | Sachs .......................... 345/600 |
| 5,491,568 A | 2/1996 | Wan |
| 5,537,516 A | * 7/1996 | Sherman et al. ............. 358/139 |
| 5,650,942 A | * 7/1997 | Granger ....................... 358/500 |
| 5,710,871 A | * 1/1998 | Tadenuma et al. ........... 358/1.9 |
| 5,781,206 A | * 7/1998 | Edge ............................ 347/19 |
| 5,791,716 A | * 8/1998 | Takagi et al. ............... 296/39.1 |
| 5,809,213 A | * 9/1998 | Bhattacharjya .............. 358/1.9 |
| 5,818,960 A | * 10/1998 | Gregory et al. ............. 382/167 |
| 5,956,469 A | * 9/1999 | Liu et al. ..................... 358/1.9 |
| 5,995,714 A | * 11/1999 | Hadley et al. ............... 358/1.9 |
| 6,008,907 A | * 12/1999 | Vigneau et al. .............. 358/1.9 |
| 6,075,888 A | * 6/2000 | Schwartz ..................... 382/167 |
| 6,178,007 B1 | * 1/2001 | Harrington .................. 358/1.9 |
| 6,222,648 B1 | * 4/2001 | Wolf et al. ................... 358/504 |
| 6,369,901 B1 | * 4/2002 | Buhr et al. ................... 358/1.1 |
| 6,377,330 B1 | * 4/2002 | Vanderbrook et al. ......... 355/35 |
| 6,606,167 B1 | * 8/2003 | Rees et al. .................... 358/1.9 |

* cited by examiner

Primary Examiner—Madeleine Nguyen
(74) Attorney, Agent, or Firm—Milton S. Sales

(57) ABSTRACT

Reproduction apparatus calibration is effected by rendering not only neutral density target patches but also a sampling of intentional off-neutral patches produced by selecting sets of red, green, and blue (and sometimes black) input code values for those patches which deviate from sets of values that would produce neutral densities. Then, by analyzing how the measured densities of all the patches change with changes in code values, the optimum set or sets of the three (or four) input code values, that when used together produce a desired set of aim neutral density patches in a single iteration, are determined.

5 Claims, 3 Drawing Sheets

| | R | G | B |
|---|---|---|---|
| PATCH 1 | 104 | 99 | 99 |
| PATCH 2 | 99 | 104 | 99 |
| PATCH 3 | 99 | 99 | 104 |
| PATCH 4 | 100 | 100 | 100 |

|         | R   | G   | B   |
|---------|-----|-----|-----|
| PATCH 1 | 104 | 99  | 99  |
| PATCH 2 | 99  | 104 | 99  |
| PATCH 3 | 99  | 99  | 104 |

*FIG. 4*

|         | R   | G   | B   |
|---------|-----|-----|-----|
| PATCH 1 | 104 | 99  | 99  |
| PATCH 2 | 99  | 104 | 99  |
| PATCH 3 | 99  | 99  | 104 |
| PATCH 4 | 100 | 100 | 100 |

*FIG. 5*

CALIBRATION OF COLOR REPRODUCTION APPARATUS

FIELD OF THE INVENTION

This invention relates to color calibration for digital color reproduction apparatus such as, for example, a color fax or a printer.

BACKGROUND OF THE INVENTION

Color reproduction apparatus renders an image from color signals representing a color image description. The input to such a color reproduction apparatus is an array of color signals (sets of input code values) communicating the desired colors of a corresponding array of picture elements in the image to be rendered.

The reproduction apparatus causes cyan, magenta and yellow, and sometimes black, dyes to be laid down on a receiving medium in response to color signals (its inherent drive code values) applied to its dye marking or producing devices.

A goal is to make the renderings match an original intent as nearly as possible. In order to do so, a transform is employed which maps the received input code values, normally in RGB space, to the reproduction apparatus' inherent drive code values, so that the system faithfully reproduces the color image original. Often the transform is implemented by employing a set of three or four one-dimensional calibration lookup tables. The process of deriving such a transform is called system color calibration.

Such apparatus requires re-calibration from time to time due to changes in the apparatus' behavior, as might be affected by the state of processor chemicals if any are used, color marking system drifts, and changes in receiver characteristics. Differences in receiver characteristics might be caused by different recipes, variations in receivers from one coating event to another, and different surface finishes (i.e., glossy versus matte finishes) as are commonly encountered using photographic receivers.

Calibration of a color reproduction apparatus begins by specifying color aim curves. A color aim curves are a set of three or four separate curves, one for each of the red, green blue and possibly black channels and each specifies the desired density output as a function of the corresponding input code value. It is intended that the three (or four) separate curves are to be used in concert and is designed to sample the entire density range. It is commonplace that when the input code values for red, green and blue channels are equal, that a visually neutral gray is to be rendered. The color aim curve defines both the definition of neutral in terms of the relationship between measured densities and the relation between (common) input code values and output densities. The entries of the table define a relationship of density as a function of input code value, or:

$$\text{Density} = f(iCV)$$

It is further commonplace to develop three such functions for a 3-color printer, one for each color. Thus, the family of functions can be expressed as:

$$\text{Density}_{Red} = f_{red}(iCV_r),$$

$$\text{Density}_{Green} = f_{green}(iCV_g), \text{ and}$$

$$\text{Density}_{Blue} = f_{blue}(iCV_b).$$

These equations are used to find the correct drive code values for each entry in the three calibration lookup tables.

Often, aim curves are linear. A truly neutral density (gray) calibration target (FIG. 1) contains a series of aim neutral (gray) density patches, which are encoded as grays ranging from white to black. The input code values in the target's description are passed through existing calibration lookup tables to remap them into drive code values that the reproduction apparatus will actually use to make a print. If the reproduction apparatus is in calibration, the resultant print will have the correct aim densities. Mathematical transforms may be employed in lieu of lookup tables. The resulting densities of the rendered patches are measured using an optical instrument such as a densitometer; and compared to the aim densities. If any of the patch density values are different than aim, being either too light or dark, or possess a non-neutral hue, then new sets of calibration lookup table values or transforms are derived using a mathematical method such as regression so as to increase or decrease the density of the corresponding color.

The limitation in this process is that the red density is not just a function of the cyan drive code value. Rather, it is a function of the drive code values of all the other colors. Albeit, the red density has a strong dependency on the cyan drive code value and a weaker dependency on the other drive code values. This being the case, if one adjusts, say, the magenta drive code value to make a correction to the green density, then the red density will change even though the cyan code values do not change. Similarly, changes to the cyan code values will produce changes to the green and blue densities. Although this known calibration process usually works because the cross-dependencies are small, it is often necessary to conduct a series of successive calibrations, each using the previous output lookup tables, in order to achieve a final calibration within specification.

DISCLOSURE OF THE INVENTION

It is an object of the present invention to provide for calibration of color reproduction apparatus by analyzing the densities read off of a calibration target rendered on the reproduction apparatus and by computing a new calibration lookup table for bringing the color reproduction apparatus into calibration such that the desired behavior of the reproduction apparatus when it is in calibration is described by an aim curve which specifies the desired density output as a function of drive code values.

It is another object of the present invention to provide for calibration of color reproduction apparatus by analyzing the densities read off of a calibration target rendered on the reproduction apparatus and by computing a new calibration lookup table or equivalent thereof for bringing the color reproduction apparatus into calibration such that the desired behavior of the reproduction apparatus when it is in calibration is described by an aim curve which specifies the desired density output as a function of drive code values in a single pass.

The present invention involves the rendering of a target containing not only neutral density patches but also a sampling of intentional off-neutral patches, produced by selecting sets of red, green, and blue input code values for those patches which deviate from sets of values that would produce neutral densities, and then, by analyzing how the measured densities of all the patches change with changes in code values, determining the optimum set or sets of the three input code values that when used together produce a desired set of aim neutral density patches in a single iteration.

According to a feature of the present invention, calibration is effected by using the color reproduction apparatus to produce a calibration target having a plurality of color patches by using input code values which correspond to a sampling of color densities. One subset of the color patches is intended to have neutral color density values and another subset of the color patches is intended to have non-neutral color density values deviating in their mix of red, green, and blue from each other. The color densities of the color patches produced on the calibration target are measured. Error signals characteristic of differences between measured color densities and intended color densities are produced. Finally, the converting process of said reproduction apparatus is adjusted as a function of the error signals so as to provide output color densities closer to the intended color densities.

The invention, and its objects and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which:

FIG. 4 is a chart of patch code values; and

FIG. 5 is another chart of patch code values.

DETAILED DESCRIPTION OF THE INVENTION

The present description will be directed in particular to elements forming part of, or cooperating more directly with, apparatus in accordance with the present invention. It is to be understood that elements not specifically shown or described may take various forms well known to those skilled in the art.

Figure 1:
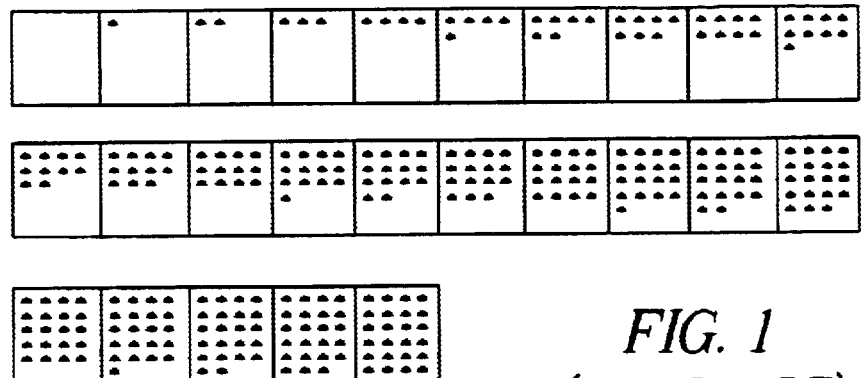
FIG. 1 is a schematic diagram showing a near-neutral test pattern employed in the prior art.
Figure 2:
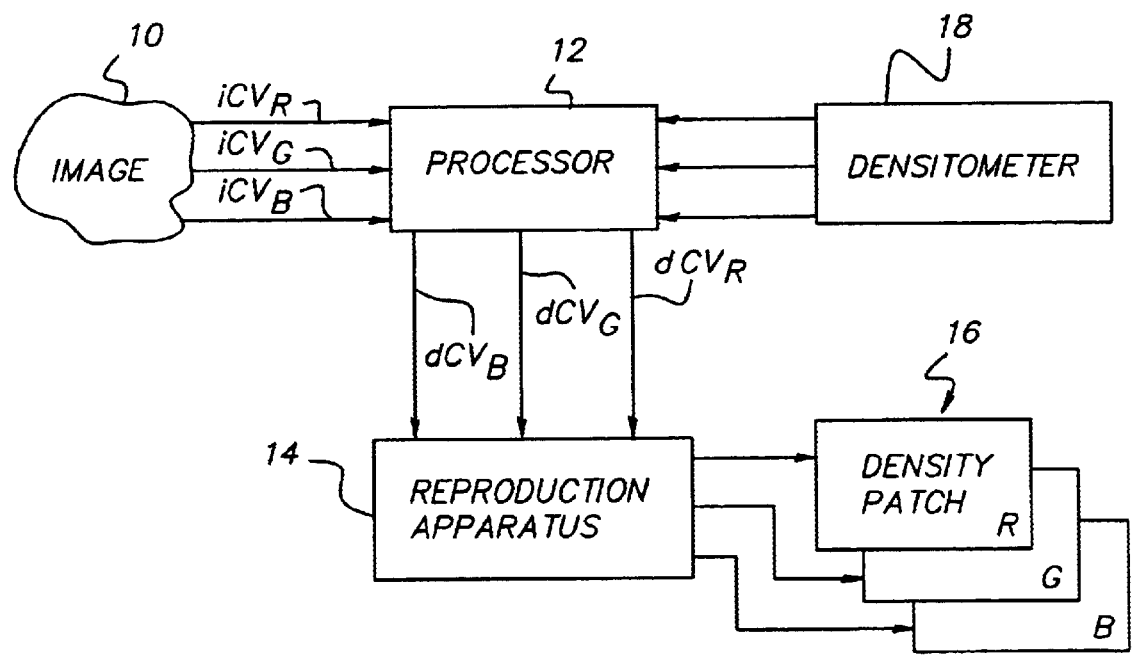
FIG. 2 is a schematic diagram illustrating a color reproduction system according to the present invention.

Referring to FIG. 2, a color image 10, represented in digital form as a plurality of image input code values $iCV_R$, $iCV_G$, $iCV_B$, corresponding respectively to desired densities $D_R$, $D_G$, and $D_B$, is inputted by a digital image processor 12. The image processor or the reproduction apparatus contains three separate calibration lookup tables (or channels) in a 3-color reproduction apparatus (one lookup table for each color: red, green and blue) for converting received digital input code values $iCV_R$, $iCV_G$, $iCV_B$ into uniquely-associated drive code values $dCV_R$, $dCV_G$, and $dCV_B$, respectively, for a reproduction apparatus 14. The image processor or the reproduction apparatus may contain four lookup tables or channels for a 4-color reproduction apparatus (black and the other three colors). Mathematical transforms may be employed in lieu of lookup tables. Reproduction apparatus 14 uses the code values to produce color separations for the final rendering.

Figure 3:
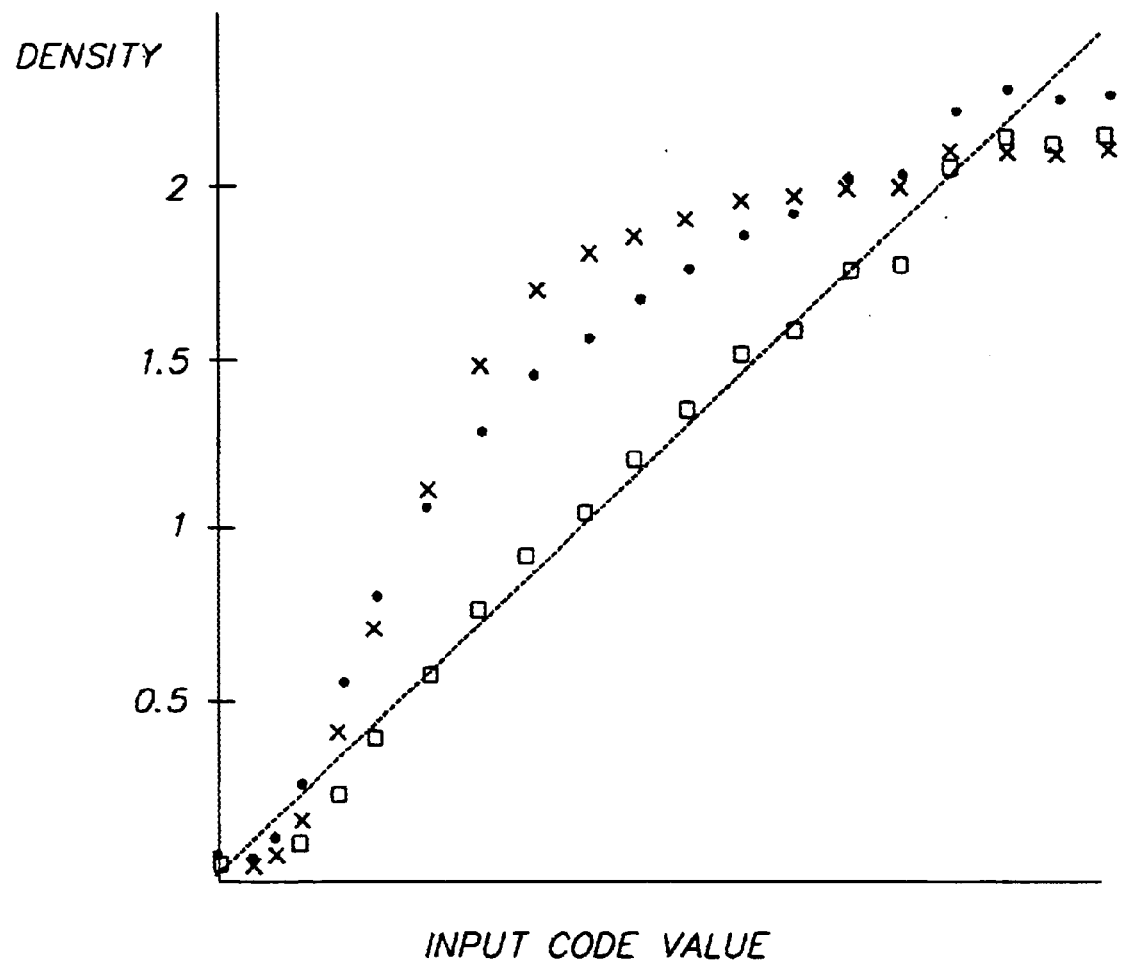
FIG. 3 is a plot of measured density data from a target verses input code value plotted with the desired behavior.

Calibration of the color reproduction apparatus begins by specifying one or more aim curves of the desired density output as a function of input code values for the entire density range. In FIG. 3, the diagonal line represents the desired behavior of the system for one possible aim curve description whereby input code values are linearly related to desired output densities. A calibration target containing a series of both neutral and non-neutral aim color density patches 16 is digitized into a series of density signals and passed through image processor 12 to remap the image's input code value signals into drive code values used by reproduction apparatus 14 to make a rendering. The resulting densities of the rendered patches are measured using an optical instrument such as a densitometer 18; and compared to the intended color densities. In FIG. 3, the data points are the actual measured densities from the target plotted against the target input code values. If, as in FIG. 3, any of the patch density values are different than intended, being either too light or dark, or possess a non-neutral hue, then, using a mathematical method such as regression, new sets of lookup table values or transforms are derived so as to increase or decrease the density of the corresponding color.

The present invention, recognizes that in the calibration processes, each color density is not just a function of the drive code value for that color, but rather, it is a function of the drive code values of all the other colors. For example, color reproduction apparatus adapted to expose color silver halide paper with red, green, and blue light will experience dye sensitivity crosstalk wherein the behavior of each color emulsion layer of the receiver is not independent of the exposure of the other layers. That is, green light will not only expose the green sensitive emulsion layer, but will have some effect on the red and blue sensitive emulsion layers as there are overlaps in sensitivity. Accordingly, changing the drive code values for one color will result in small effective changes in the other color channels.

Rather than rendering only patches having neutral code values, the present invention provides for producing a series of additional patches that vary the red, green and blue input code values somewhat from neutral values. For example, one might render one patch with neutral input code values, another patch in which the red input code value is increased slightly, still another patch in which the green input code value is increased, and yet another patch in which the blue input code value is increased. In this way, one not only can determine if, and by how much the neutral patches differ from neutral, but also how much the densities change for known changes in the individual drive code values which are determined by passing the known input code values through the calibration look up tables.

There are a number of mathematical paradigms for using this information. In a very simple example, a certain neutral aim color should be achieved with drive code values of, say, 100, 100, and 100. If one renders three patches, shown in FIG. 4; one with drive code values 104, 99, and 99; the second with drive code values 99, 104, 99; and the third with drive code values 99, 99, and 104, and if in the domains 99 to 104 the behavior is assumed to be linear, relations between drive code values and resulting densities can be written as:

$$D_r = a^* dCV_r + b^* dCV_g + c^* dCV_b,$$

$$D_g = e^* dCV_r + f^* dCV_g + g^* dCV_b, \text{ and}$$

$$D_b = i^* dCV_r + j^* dCV_g + k^* dCV_b.$$

Since there are three sets of drive code values and three sets of resulting density points, $(D_r, D_g, D_b)$, there are nine equations and nine unknowns. This is a classical Matrix Algebra problem with known, published solutions. Once the nine coefficients are determined, the equations can then be used to solve for the unique set of $dCV_r$, $dCV_g$, $dCV_b$ of drive code values that produce the set of aim neutral densities, $D_r$, $D_g$, $D_b$. Given the information set forth above, numerous schemes using different numbers of variation patches and improved accuracy can be thought of by those skilled in the art. The minimum number of patches is three.

There would be two problems with the very simple example described above. One problem is that, depending on how the three sets of patches are chosen, one may never produce a neutral patch so one never can be sure that the neutral is in fact achieved. The second problem is that the functional behavior must be not only linear, but the function must pass through the origin. A simple solution to both problems in the above scheme is to add the neutral patch (100, 100, 100) as shown in FIG. 5, and to add an offset to the equations, such that:

$$D_r = C_r + a*dCV_r + b*dCV_g + c*dCV_b,$$

$$D_g = C_g + e*dCV_r + f*dCV_g + g*dCV_b, \text{ and}$$

$$D_b = C_b + i*dCV_r + j*dCV_g + k*dCV_b.$$

Adding yet another point (total of 5 patches) would allow a quadratic term in the most sensitive channel. Equations might look like:

$$D_r = C_r + a*dCV_r + b*dCV_g + c*dCV_b + p_r*dCV_r^2,$$

$$D_g = C_g + e*dCV_r + f*dCV_g + g*dCV_b + p_g*dCV_g^2,$$

$$D_b = C_b + i*dCV_r + j*dCV_g + k*dCV_b + p_b*dCV_b^2.$$

Adding additional patches would allow additional degrees of freedom to the equations and/or regression analysis to reduce the effect of noise.

The collection, called "cluster," of patches including the neutral patch and the deviated patches is hereafter referred to as a "ring-around." The target will have a group of clusters of patches, including the neutral patch and the deviated patches. Each cluster is used to produce one triad of red, green and blue drive code values that, when used together produce one neutral density patch. The ultimate objective is that each group of clustered patches is used to find a single triad of red, green and blue drive code values that produce a single aim neutral. Then, combining all such solutions for all the clusters of patches on the target, perform separate curvefits on the density vs. code value solutions for each of the color channels as if they were independent:

$$D_r = f_{red}(dCV_r),$$

$$D_g = f_{green}(dCV_g),$$

$$D_b = f_{blue}(dCV_b),$$

with the understanding that these equations are valid only when used together and the collective solutions produce a triad of densities that correspond to an aim neutral. This set of functions can be called the neutral characteristic curves of the rendering device because they describe its native behavior when producing neutral colors.

These 3 curvefit functions are then combined with the three aim curves to produce new calibration look up tables as follows. The aim curves map neutral input code values to sets of densities producing neutral. The neutral characteristic curves map the drive code values to densities producing neutral. Thus a new mapping between input code values and output code values can be determined using the neutral densities as the common link. It is to be understood that all of the steps described above are preferably performed automatically in a digital image processor, with the possible exception of manually transferring rendered test patches from the reproduction apparatus to a scanner.

According to one preferred embodiment of the present invention, a set of, say, one to two dozen neutral points are selected along the neutral axis (i.e., the locus of neutral sets-of-densities) in a three-dimensional density space whose axes corresponding to the red, green and blue densities. For each neutral point, four non-neutral points are selected such that the four non-neutral points sit on a common plane wherein (1) the neutral axis is normal to the common plane, (2) the common plane is further out (darker) on the neutral axis than the corresponding neutral point, (3) the four non-neutral points represent the corners of a square in the common plane such that the square is centered on the point where the neutral axis cuts the common plane, and (4) all four non-neutral points are roughly equidistant from each other.

The invention has been described in detail with particular reference to preferred embodiments thereof, but it will be understood that variations and modifications can be effected within the spirit and scope of the invention.

What is claimed is:

1. A method of calibrating a color reproduction apparatus which has a process for converting received digital color signals to uniquely-associated drive code values and to then produce an image rendering with color densities corresponding to the drive code values, the method comprising the steps of:

using the color reproduction apparatus to produce a calibration target having a plurality of color patches by using input code values which correspond to a sampling of color densities, wherein one subset of said color patches is intended to have neutral color density values and another subset of said color patches is intended to have non-neutral color density values deviating in their mix of red, green, and blue from each other;

measuring color densities of the color patches produced on said calibration target;

producing error signals characteristic of differences between measured color densities and intended color densities of (1) the patches intended to have neutral density values and (2) the patches intended to have non-neutral density values; and adjusting the converting process of said reproduction apparatus as a function of said error signals so as to provide output color densities closer to the intended color densities.

2. A method according to claim 1, wherein said adjusting step comprises the step of determining a relationship between said color patches by performing data interpolation from at least three of said patches, wherein said at least three patches represent a sampling of red, green, blue and black color codes.

3. A method according to claim 1, wherein said step of producing error signals comprises the step of determining target values of each of a red density, a green density, and a blue density as a function of a red drive code value, a green drive code value, and a blue drive code value.

4. A method according to claim 1, wherein said step of producing error signals comprises the step of determining target values of each of a red density, a green density and a blue density as a function of at least a red drive code value, a green drive code value, and a blue drive code value.

5. A calibration system comprising at least one first patch with a neutral density code value, at least one second patch having a red code value which is deviated from its neutral value, at least one third patch having a green code value which is deviated from its neutral value, and at least one fourth patch having a blue code value which is deviated from its neutral value, wherein said at least one second, third, and fourth patch code values are selected by:

designating a set of neutral points along a neutral axis in a three-dimensional density space whose axes corresponding to red, green and blue densities; and for each neutral point, selecting four non-neutral points such that the four non-neutral points sit on a common plane wherein (1) the neutral axis is normal to the common plane, (2) the common plane is further out on the neutral axis than the corresponding neutral point, and (3) the four non-neutral points represent corners of a square in the common plane such that the square is centered on a point where the neutral axis intercepts the common plane.

* * * * *